(12) United States Patent
Huntley et al.

(10) Patent No.: US 9,933,111 B1
(45) Date of Patent: Apr. 3, 2018

(54) ELECTRONICS MOUNT

(71) Applicant: T-H Marine Supplies, Inc., Huntsville, AL (US)

(72) Inventors: Jeffery William Huntley, Madison, AL (US); Gregory Buie, Athens, AL (US); Brad Rightnour, Mingoville, PA (US)

(73) Assignee: T-H Marine Supplies, Inc., Huntsville, AL (US)

( * ) Notice: Subject to any disclaimer, the term of this patent is extended or adjusted under 35 U.S.C. 154(b) by 0 days.

(21) Appl. No.: 15/210,024

(22) Filed: Jul. 14, 2016

Related U.S. Application Data

(60) Provisional application No. 62/192,758, filed on Jul. 15, 2015, provisional application No. 62/314,627, filed on Mar. 29, 2016.

(51) Int. Cl.
| | |
|---|---|
| *F16M 13/00* | (2006.01) |
| *F16M 13/02* | (2006.01) |
| *B63B 17/00* | (2006.01) |
| *F16M 11/06* | (2006.01) |
| *F16M 11/20* | (2006.01) |

(52) U.S. Cl.
CPC ............. *F16M 13/02* (2013.01); *B63B 17/00* (2013.01); *F16M 11/06* (2013.01); *F16M 11/2007* (2013.01); *B63B 2710/00* (2013.01); *F16M 2200/024* (2013.01)

(58) Field of Classification Search
CPC .... F16M 2200/08; F16M 11/22; F16M 13/00; F16M 11/10; F16M 11/041; F16M 13/02; F16M 5/00; F16M 11/08; F16M 13/022; F16M 11/24; F16M 11/2014; F16M 11/42; F16M 7/00; F16M 11/00; F16M 11/18

USPC ..... 248/291, 292.12, 346.01, 917, 919, 921, 248/922

See application file for complete search history.

(56) References Cited

U.S. PATENT DOCUMENTS

| | | | | |
|---|---|---|---|---|
| 6,357,712 | B1* | 3/2002 | Lu ......................... | F16M 11/10 248/185.1 |
| 7,523,904 | B2* | 4/2009 | Carnevali ............... | F16C 11/10 248/176.1 |
| 7,798,461 | B2* | 9/2010 | Hackney ............... | E04B 1/2604 248/371 |
| 8,317,152 | B1* | 11/2012 | Zhou .................... | F16M 11/041 248/122.1 |
| 8,753,030 | B2* | 6/2014 | Leonhardt ............. | F16M 11/10 248/276.1 |
| 2015/0090849 | A1* | 4/2015 | Breitweiser ........... | F16M 11/04 248/230.1 |
| 2016/0176044 | A1* | 6/2016 | Cole ...................... | B25J 9/104 700/258 |

* cited by examiner

*Primary Examiner* — Steven M Marsh
(74) *Attorney, Agent, or Firm* — Stephen H. Hall; Bradley Arant Boult Cummings LLP

(57) ABSTRACT

An electronic mount is provided to secure various electronics systems to the surface of a boat. In some embodiments, the electronics mount utilizes a base member affixed to the boat surface, a vertical member connected to the base member, an arm assembly, elbow assembly, plate support member, and mounting plate that allows a user to pivot or rotate the system to achieve a desired orientation. The present invention allows a user to mount electronics to a boat in a secure manner while also providing freedom of direction.

20 Claims, 9 Drawing Sheets

SECTION A-A

ELECTRONICS MOUNT

CROSS REFERENCE TO RELATED APPLICATIONS

This application claims the benefit of U.S. Provisional Application No. 62/192,758 filed on Jul. 15, 2015, and U.S. Provisional Application No. 62/314,627 filed on Mar. 29, 2016, the entire contents of which are herein incorporated by reference.

FIELD OF THE INVENTION

The invention relates generally to an improved electronics mount and more specifically relates to an improved electronic mount for use with electronics used on boats.

BACKGROUND ART

Many boats are equipped with electronics which may be used to monitor and provide boaters with information about navigation, water temperature, water depth, underwater topography, and fish location. Common manufacturers include Lowrance, Garmin, Hummingbird, Raymarine, Eagle, and many others. Many of these electronic units have become larger and more sophisticated over time. In fact, many of the devices are over twelve inches wide and six inches tall. These devices can be quite heavy, placing a lot of stress on their mounting brackets. Traditionally, these electronics are mounted with a single base secured to the boat frame, with a single vertical member, and a U-shaped bracket sitting atop the vertical member. The U-shaped bracket will often have side supports with knobs to secure the electronics to the upper portion of the U-shaped bracket. In many configurations, the electronics seated in the U-shaped bracket can only be tilted downwardly or upwardly to the user view, or rotated around on the vertical member, with no other degrees of freedom or movement (for example, no vertical or horizontal movement).

In use, as the boats are operated, and the electronics continually shaken, the manufacturer-provided brackets become stressed, and these heavy electronics can become loose from their brackets, base, or vertical members. In some instances, the brackets can completely release the electronics, causing damage or loss. Additionally, many of the boats being manufactured do not allow sufficient space for wider electronics to be mounted in a way that allows the electronics to be pivoted around the base (for example, facing toward the boat operator when driving, or facing the front of the boat while fishing). Thus, the need exists for an electronics mount that provides additional sturdiness while simultaneously allowing greater freedom of movement.

SUMMARY OF THE INVENTION

In view of the foregoing disadvantages inherent in the conventional type of methods and systems now present in the prior art, the present invention provides an improved electronics mount that is suitable for use with modern-day large and heavy electronics. In various embodiments, the invention allows a more secure mount, allows more directional freedom, and is configured to allow more room to pivot large electronic screens.

In one embodiment, the electronics mount generally comprises a base member (or base assembly) that is secured to the boat, a vertical member (or post) secured to the base member, an arm assembly secured to the vertical member, an elbow assembly, a plate support member, and a mounting plate.

In other embodiments, the electronics mount generally comprises a base member (or base assembly) that is secured to the boat, a vertical member (or post) secured to the base member, a plate support member, and a mounting plate.

Other objects and advantages of the present invention will become obvious to the reader and it is intended that these objects and advantages are within the scope of the present invention. While the preferred use of the electronics mount is to secure marine electronics to boats in such a way that allows greater stability and freedom of movement as described herein, it is contemplated that the present invention can be used to secure electronics to a variety of surfaces or other types of vehicles, and may be used in a wide range of industries.

To the accomplishment of the above and related objects, this invention may be embodied in the form illustrated in the accompanying drawings/pictures, recognizing however, that the drawings are illustrative only, and that changes may be made in the specific construction illustrated and described within the scope of the appended claims.

BRIEF DESCRIPTION OF DRAWINGS

It should be noted that identical features in different drawings may be shown with the same reference numeral or described with the same terminology. Various other objects, features and attendant advantages of the present invention will become fully appreciated as the same becomes better understood when considered in conjunction with the accompanying drawings.

DETAILED DESCRIPTION

Figure 1:
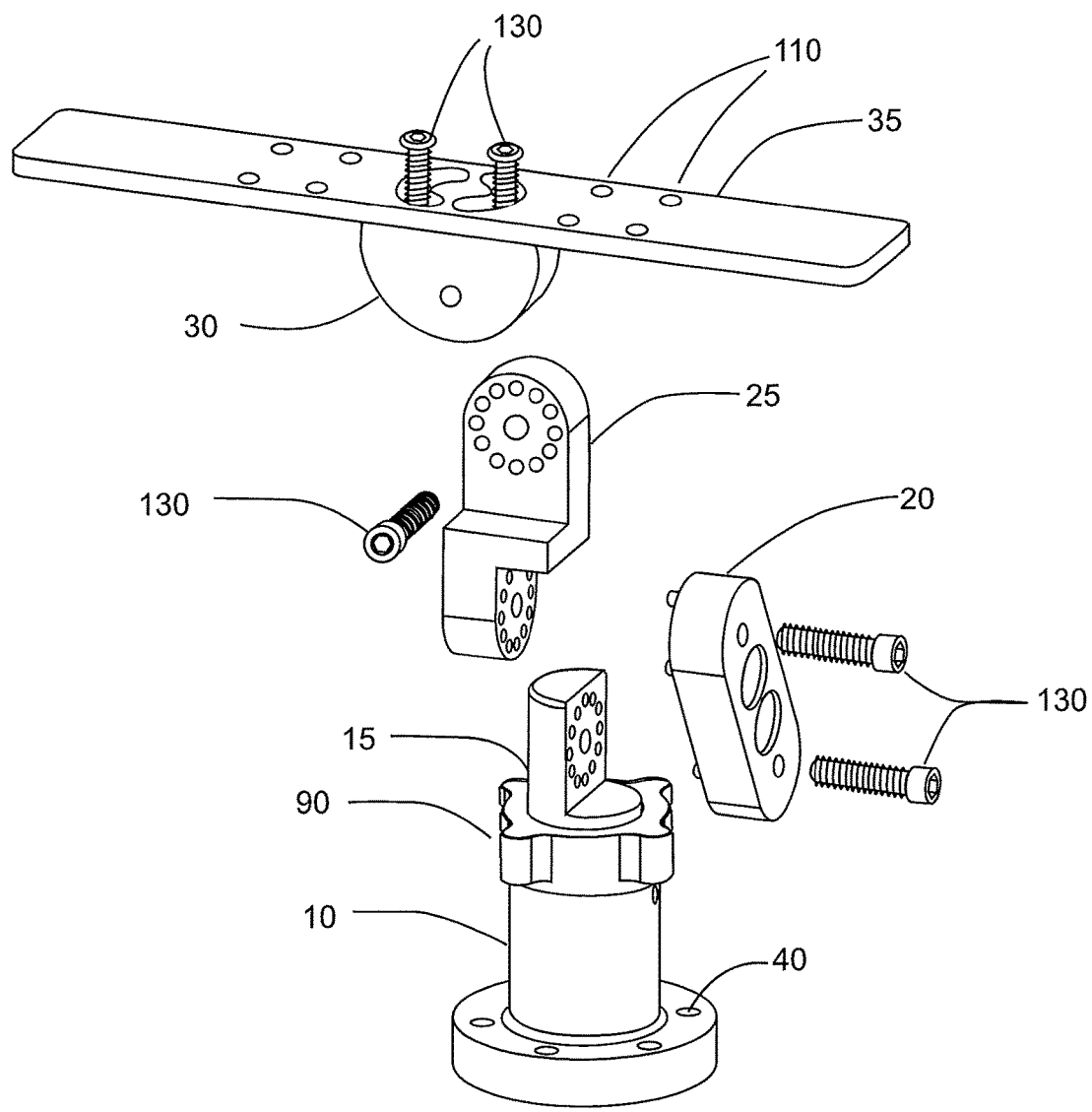
FIG. 1 is one embodiment of the electronics mount.

In various embodiments, one or more of the following components (and reference numerals) may be used:
base member (or base assembly) 10
vertical member (or post) 15
arm assembly 20
elbow assembly 25
plate support member 30
mounting plate 35
mounting holes 40 recessed cavity 45
spring 50
base insert 55
spring plate 60
bottom portion (vertical member) 65
upper surface (bottom portion of vertical member) 66
dowel pins 70
cylindrical base portion (vertical member) 75
locking channel 80
locking channel recess 85
locking nut 90
top portion (base member) 95
threaded portion (base member) 100
top portion (vertical member) 105
lower surface (top portion of vertical member) 106
recess 110
dowel pins (on arm assembly or elbow assembly) 115
top portion (arm assembly) 120
bottom portion (arm assembly) 125
locking bolt 130
upper portion (elbow assembly) 135
lower portion (elbow assembly) 140
mounting face 145
top portion (plate support member) 150
lip (vertical member) 155
cam arm 160
cam arm bolt 165

FIGS. 1 through 9 illustrate various views and embodiments of the present invention.

Figure 2:
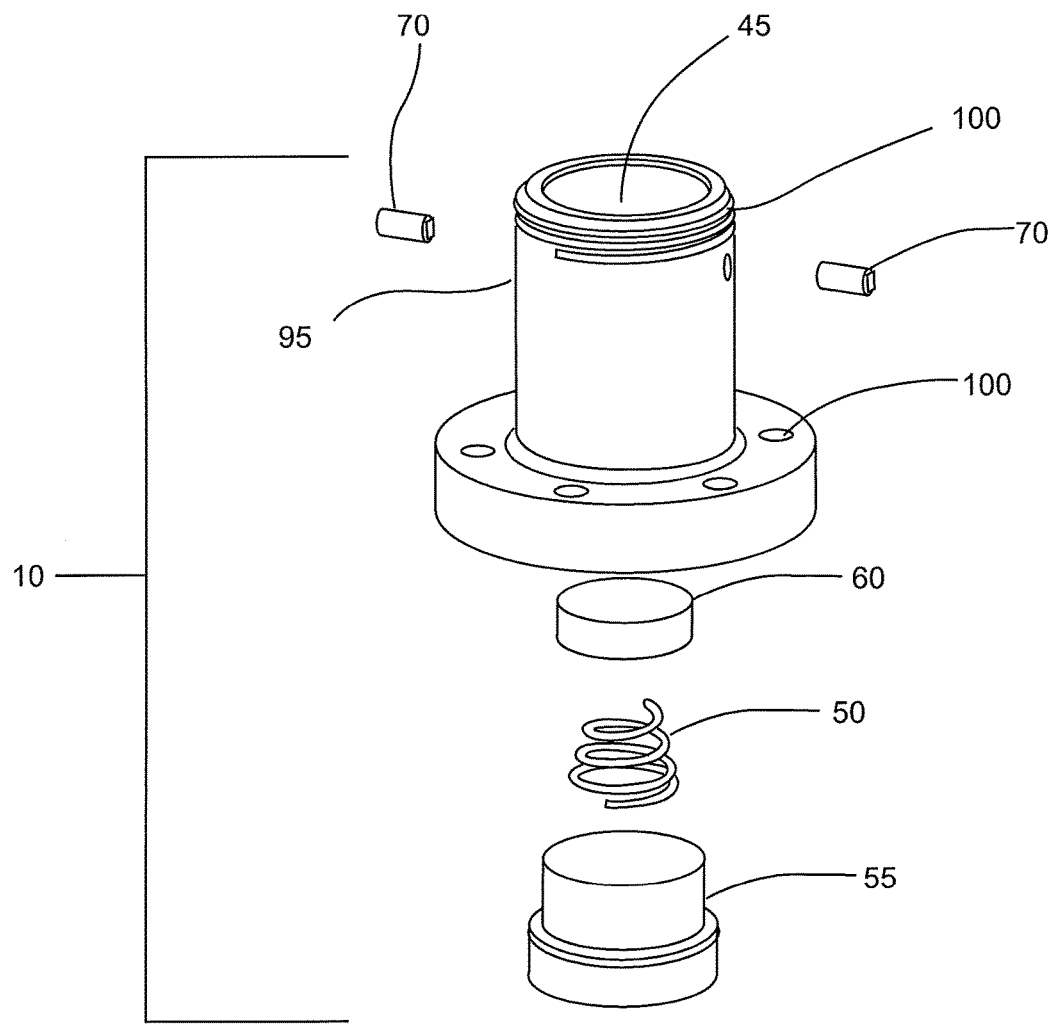
FIG. 2 is one embodiment of the base member.

Referring generally to FIGS. 1 and 2, in various embodiments, a base member 10 can be used to secure the system to the boat. In a preferred embodiment, the base member 10 and all other members and components described herein may be manufactured using aluminum or stainless steel, though a wide variety of other materials, or combinations thereof, may be used, including high-strength plastics. The base member 10 may have one or more mounting holes 40 that can be used to secure the base member 10 to the boat, for example, using bolts or screws, or the base member 10 can be secured to the boat using other traditional ways of mounting devices to a boat. The base member 10 may have a recessed cavity 45 configured to receive a vertical member (or post) 15. In some embodiments, the base member 10 may include a spring 50 or other mechanism to provide an upward force against the inserted vertical member 15. The base member 10 may also include a base insert 55 and spring plate 60 (shown in FIG. 2) placed on top of the spring 50, against which the spring 50 will provide an upward force. The spring plate 60, as positioned between the spring 50 and the vertical member 15, will also provide a contact point for the bottom portion 65 of the vertical member 15 inserted into the base member 10. The top of the spring plate 60 is shown in FIG. 2, with the spring plate 60 inside a recessed cavity 45 of the base member 10, and the spring 50 placed below the spring plate 60. Dowel pins 70 may be used inside the recessed cavity 45 of the base member 10 to provide an additional way to secure the vertical member 15 to the base member 10, as further described below. The base member 10 may also have other types of protrusions built into the base member 10 rather than using separate pins 70. The base member 10 may also include a base insert 55, placed below the spring 50. The base insert 55, shown in FIG. 2, provides a contact point between the bottom of the base member 10 and the surface of the boat, to which the base member 10 is secured. Preferably, the base insert 55 sits flush with the bottom of the base member 10 to provide a flat surface that is secured to the boat. The base member 10 can also have alternative configurations to receive the vertical member 15, for example, adapted to utilize existing boat hardware attachment points.

The base member 10 can be of various sizes. In the preferred embodiment, the base member 10 is circular in cross section, but other configurations can be used. In one embodiment, the base member is between 1 and 6 inches tall and the bottom has a width (or diameter) of between 1 and 6 inches. In a more preferred embodiment, the base member 10 is between 3 and 4 inches tall and between 3 and 4 inches wide (or diameter) at its bottom. Other lengths and widths can be used. The base member 10 top portion 95 preferably has a smaller cross section than the bottom.

Referring generally to FIGS. 1, 3(*a*), and 3(*b*), in various embodiments, a vertical member 15 is used and inserted into the recessed cavity 45 of the base member 10. Although various configurations can be used, in a preferred embodiment, the vertical member 15 has a cylindrical base portion 75, which is received into a cylindrical recessed cavity 45 of the base member 10. The cylindrical base portion 75 of the vertical member 15 may also include one or more locking channels 80 configured to interface with and set against the dowel pins 70 (or other protrusions) in the recessed cavity 45 of the base member 10. The locking channels 80 as shown in FIGS. 3(*a*) and (*b*) are oriented such that the cylindrical base portion 75 of the vertical member 15 can be rotated with downward force in order for the dowel pins 70 (or protrusions) to reach a resting and locked position, similar to the threads of a screw. Preferably, the locking channel 80 is angled downward so when the vertical member 15 is rotated, it slides downward into the recessed cavity 45. The locking channel 80 may also have an additional locking channel recess 85 to receive the dowel pins 70 (or other protrusions). This configuration provides additional security, because the vertical member 15 may not be dislodged with an upward force alone. Instead, a rotation movement in the opposite direction must be used in conjunction with the upward force in order for the locking channel 80 and locking channel recess 85 to release the dowel pins 70 (or protrusions) in the recessed cavity 45 of the base member 10. The locking channel 80 may be configured in a number of ways that are not shown in the attached Figures.

In some embodiments, a locking nut 90 or sleeve may be used with the vertical member 15 that may slide downward onto the top portion 95 of the base member 10 or twist into a threaded portion 100 of the base member 10 (See FIGS. 1, 2, 8(*a*), 8(*b*), and 9 for examples). The locking nut 90 may help to secure the vertical member 15 against the base member 10. Thus, for embodiments using a spring 50 or other mechanism providing an upward force on the vertical member 15, the locking nut 90 provides an opposing downward force to enable a more secure mount. Alternatively, for embodiments not using a spring 50 or other mechanism providing an upward force, the locking nut 90 may simply be an additional measure for securing the vertical member 15 to the base member 10. Similarly, for embodiments not using dowel pins 70 (or other protrusions) or locking channels 80 in the base portion 10 of the vertical member 15, the locking nut 90 may provide the necessary force to secure the vertical member 15 to the base member 10. Although various configurations can be used, in a preferred embodiment, shown in FIGS. 8(*a*), 8(*b*), and 9, the locking nut 90 may include threads on its interior so that when it is twisted downward, the locking nut 90 becomes secured to threads located on the threaded portion 100 of the base member 10, holding the vertical member 15 and base member 10 together.

Figures 3A, 3B:
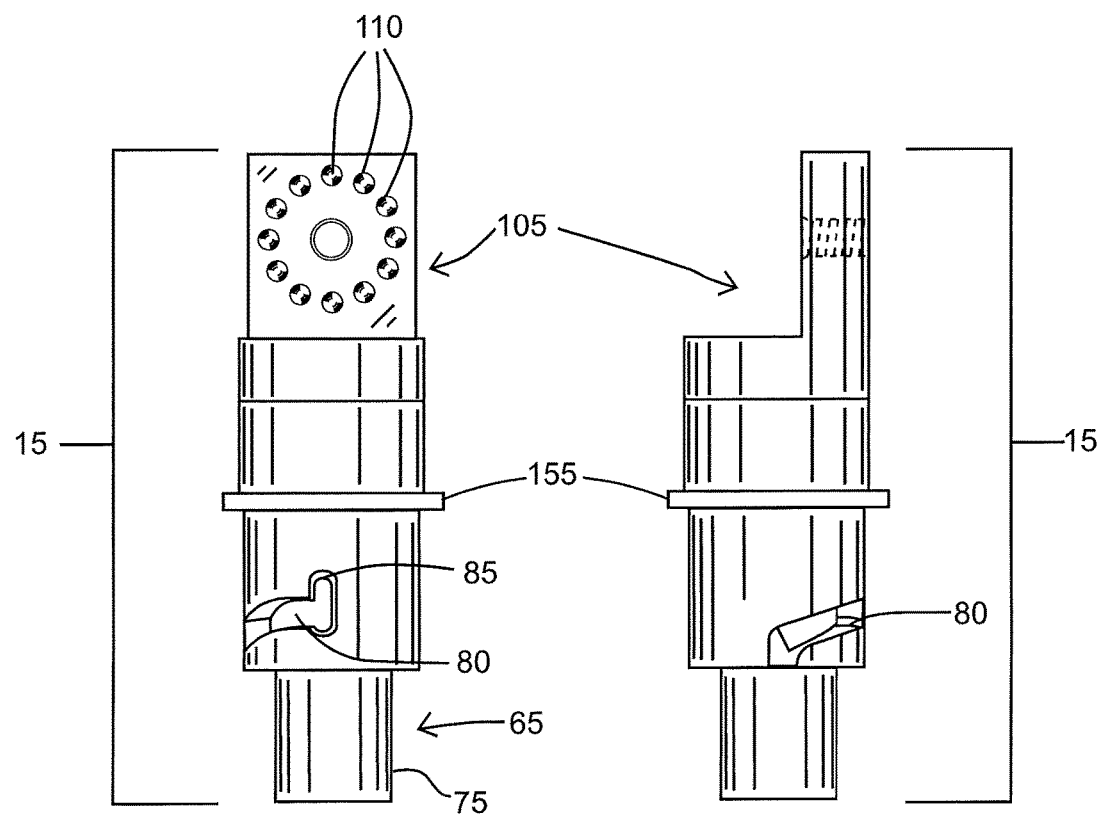
FIG. 3(a) is a front view of one embodiment of the vertical member.
FIG. 3(b) is a side view of the embodiment of FIG. 3(a).
Figures 4A, 4B:
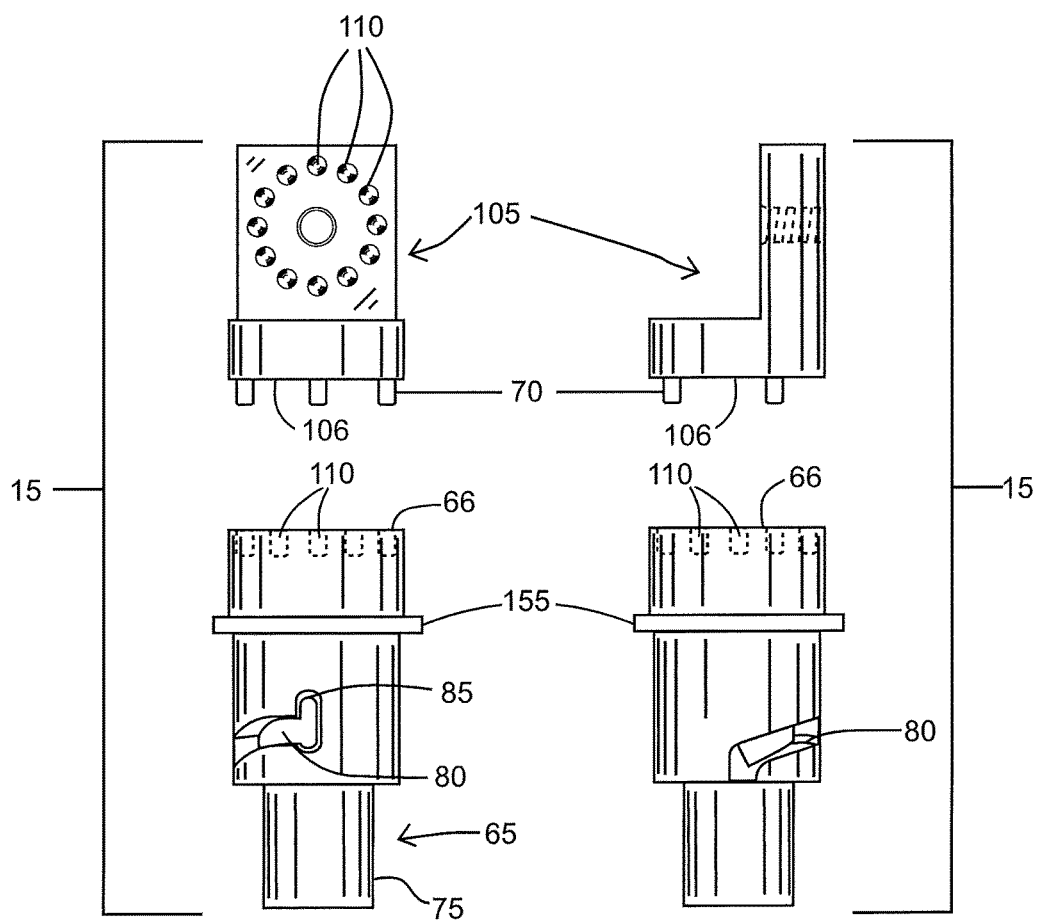
FIG. 4(a) is a front view of an alternative embodiment of the vertical member as two separate components.
FIG. 4(b) is a side view of the embodiment of FIG. 4(a).
Figures 5A, 5B:
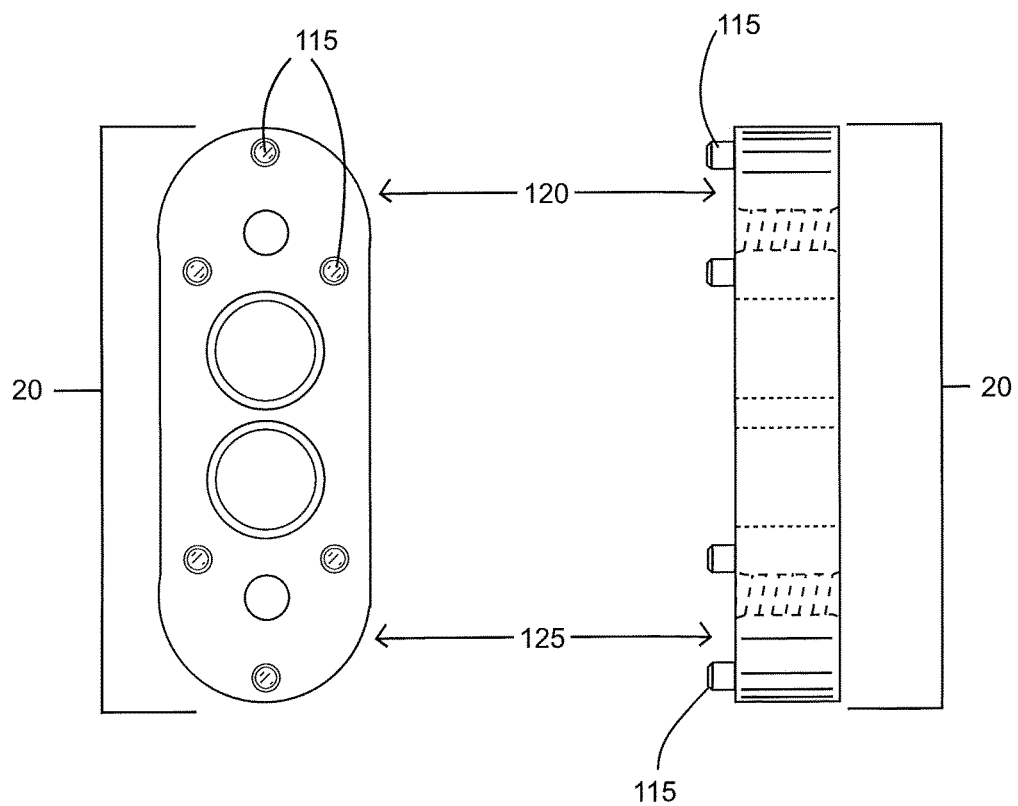
FIG. 5(a) is front view of one embodiment of the arm assembly.
FIG. 5(b) is a side view of the embodiment of FIG. 5(a).

Referring generally to FIGS. 1, 3(a), 3(b), 5(a), and 5(b), the top portion 105 of vertical member 15 may be attached to the arm assembly 20. At the top portion 105 of the vertical member 15, one or more recesses 110 may be provided for attaching an arm assembly 20 to the vertical member 15. The top portion 105 of the vertical member 15 that interfaces with the arm assembly 20 may be a flat face. In one embodiment, the recesses 110 may be multiple depressions configured to receive dowel pins 115 (or other interface structure or protrusions) protruding from the bottom portion 125 of the arm assembly 20. The recesses 110 may be arranged in a circular or radial pattern, as shown in FIGS. 3(a) (not shown in FIG. 3(b)), so that the arm assembly 20 can be attached in a number of different positions. For example, as shown in FIGS. 5(a) and 5(b), the bottom portion 125 of the arm assembly 20 may include protruding dowel pins 115 (or other structure) which fit into the recesses 110 in the vertical member 15. Any number of pins 115 or protrusions can be used. In one embodiment shown in FIGS. 5(a) and 5(b), three pins 115 are used on the bottom portion 125 of the arm assembly 20. As shown in FIG. 1, a locking bolt 130 may then be inserted through the arm assembly 20 and vertical member 15 (for example, in the center of the recesses 110 of the vertical member 15 and centered in the bottom portion 125 of the arm assembly 20) to hold the two members together securely. If a user preferred to pivot or rotate the arm assembly 20 so that the electronics are oriented at a different angle from the base assembly 10, the locking bolt 130 can be removed (or loosened) and the arm assembly 20 rotated so that the pins 115 are seated in different recesses 110. The arm assembly 20 can be rotated such that the dowel pins 115 fit into new recesses 110 that are adjacent to the previous recesses 110 in the circular configuration. The locking bolt 130 can then be reinserted (or simply tightened) to secure the arm assembly 20 to the vertical member 15.

In another example, the arm assembly 20 may include the same number of protruding dowel pins as there are depressions in the recesses 110 of the vertical member 15. Again, because the dowel pins 115 and recesses 110 can be arranged in a circular formation, the arm assembly 20 can be rotated in many positions. Each dowel pin 115 simply fits into the recess 110 adjacent to the recess 110 which it previously occupied. It should be recognized that the recesses 110 do not need to be all the way through the structure, and that alternative protrusions (other than dowel pins 115) and recesses 110 can be used.

The vertical member 15 can be of various sizes. In one embodiment, the vertical member 15 is between 1 and 8 inches tall. In a more preferred embodiment, the vertical member 15 is between 3.5 and 5.5 inches tall. Other lengths can be used. The vertical member 15 bottom portion 65, including the portion in which the locking channel is located 80, is preferably circular in cross section to allow rotation within the base member 10. As shown in FIGS. 3(a) and 3(b), the vertical member 15 can have a lip 155 which is designed to rest against the top of the base member 15 when the vertical member 15 is inserted into the base 10.

In an alternative embodiment shown in FIG. 4, the vertical member 15 may be in the form of two separate components, e.g., separating the vertical member 15 bottom portion 65 from the vertical member 15 top portion 105. In one embodiment of this configuration, the upper surface 66 of the vertical member 15 bottom portion 65 may have recesses 110 to receive protrusions (including dowel pins 70) located on the bottom surface 106 of the top portion 105 of the vertical member 15. As with the other components, the recesses 110 and protrusions (including dowel pins 70) can be of multiple configurations as described above, including any number of recesses 110 and protrusions, sizes, etc. the recesses 110 and dowel pins 70 (or other protrusions) may interact like that described between the vertical member 15 and arm assembly 20. Utilizing this configuration allows another point of freedom of movement, allowing the overall assembly to be even more configurable. In other words, the vertical member 15 in this embodiment can act as a separate moveable elbow joint.

Figure 8A:
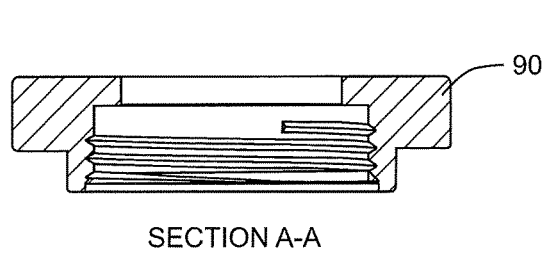
FIG. 8(a) is cross section view of one embodiment of the locking nut shown in FIG. 8(b).
Figure 8B:
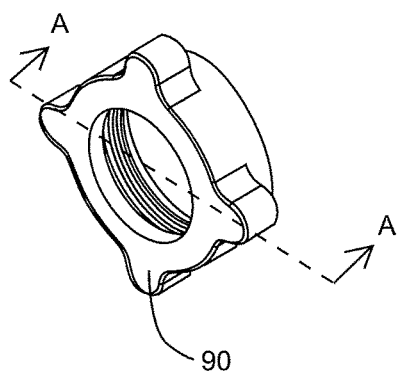
FIG. 8(b) is one embodiment of the locking nut.
Figure 9:
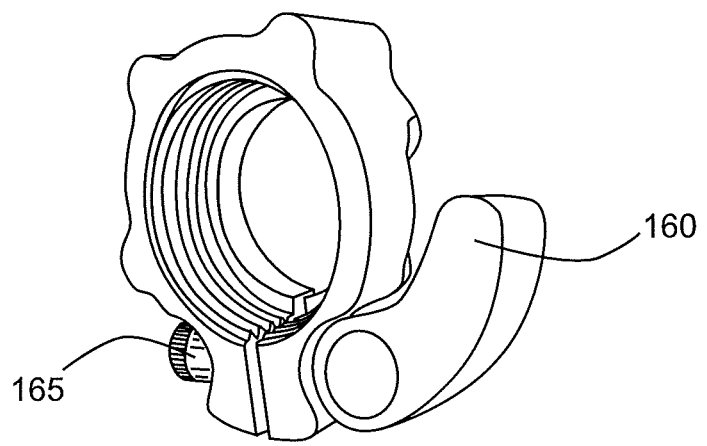
FIG. 9 is an alternative embodiment of the locking nut using a cam arm and cam arm bolt.

The locking nut 90 can be of various configurations. In one embodiment shown in FIGS. 8(a) and 8(b), the locking nut 90 can be a threaded locking nut 90 that can be screwed on the threaded portion 100 of the base member 10 to secure the vertical member 15 to the base member 10, via a lip 155 on the vertical member 15. In other words, the bottom portion of the rim of the locking nut 90 interfaces with the top of the lip 155 of the vertical member 15. As shown in FIGS. 8(a) and 8(b), the locking nut 90 can have flanges on the outside surface to help allow a user to grip and twist the locking nut, or the locking nut can have a series of flat surfaces like a traditional nut. In an alternative embodiment shown in FIG. 9, the locking nut 90 can have a cam arm 160 and associated cam arm bolt 165, and wherein locking nut 90 has a gap in the body of the locking nut 90. Using this configuration, as the locking nut 90 is screwed on the threaded portion 100 of the base member 10 (normally with the cam arm 160 in the open position), and the base member 10 can be secured to the vertical member 15 via the lip 155 on the vertical member 15 as with a standard locking nut 90. However, when the cam arm 160 is moved into the closed position, the locking nut 90, via the interaction between the cam arm 160, cam arm bolt 165, and gap in the body of the locking nut 90, further secures the base member 10 to the vertical member 15 and closes the gap in the body of the locking nut 90. With the extensive vibration that is experienced while on the water in a boat, this embodiment of the locking nut 90 has been demonstrated to provide a more secure connection between the vertical member 15 and base member 10 than a standard locking nut 90. While the use of the cam arm 160 and cam arm bolt 165 is shown in connection with the locking nut 90, it should be recognized that the locking bolts 130 shown in FIG. 1 could also utilize similar configurations incorporating cam arm 160 (and cam arm bolt 165) as applicable.

Although the vertical member 15 and arm assembly 20 are shown in the figures as fitting together using recesses 110 and corresponding dowel pins 115, other methods of connection and rotation may be used for these or any of the other various members described herein. For example, the recesses 110 in the various members can be threaded and a screw or bolt can be used to secure one member to another, or a ball-and-socket joint which can be locked into place may be used to connect the various members. In one embodiment (not shown), the top portion 105 of the vertical member 15 may include protrusions in the form of "teeth" which protrude away from the surface in intervals. Conversely, the bottom portion 125 of the arm assembly 20 surface may include outwardly protruding teeth (or corresponding recesses 110) of the same size and at the same intervals. Similar to the cogs of a wheel, the teeth on the vertical member 15 may interlock with the teeth on the arm assembly 20 to prevent rotation of the members in relation to one another. A locking bolt 130 may be inserted through the assembly 20 and vertical member 15 recess 110 to hold the two members together securely. Using this method, a user may need to simply loosen the locking bolt 130 to a degree that the opposing teeth can be pulled apart just enough to rotate the arm assembly 20. Then, a user may again interlock the teeth in the new position and tighten the locking bolt 130 to secure the vertical member 15 and arm assembly 20 together. An advantage of this configuration is that it allows for rotation without the need to completely remove the locking bolt 130. The various methods and structure discussed above can also be used for connections between the various other structured members. Obviously, the location of the recesses 110 and protrusions (e.g., the dowel pins 115) can be reversed, so that the recesses 110 are on the arm assembly 20 and vice versa.

Various lengths of the arm assembly 20 can be used. In one embodiment, the arm assembly 20 is between 1 and 8 inches in length. In a more preferred embodiment, the arm assembly is between 3.5 and 5.5 inches in length. Other lengths can be used. As shown in FIGS. 1, 5(*a*), and 5(*b*), the arm assembly 20 bottom portion 125 and arm assembly 20 top portion 120 may have threaded holes to receive locking bolts 130, although other securing means can be used. As shown in FIGS. 5(*a*) and (*b*), dowel pins 115 may be spaced around the respective bottom portion 125 and top portion 120.

As shown in FIGS. 5(*a*) and 5(*b*), the top portion 120 of the arm assembly 20 may also use dowel pins 115 or other protrusions similar to the configuration of the bottom portion 125 of the arm assembly 20. As described above, in alternative embodiments (not shown), the top portion 120 of the arm assembly 20 may include one or more recesses 110 similar to the recesses 110 at the top portion 105 of the vertical member 15, in order to secure an elbow assembly 25 or second arm assembly 20. It should be noted that, while the embodiment shown in the attached Figures includes an elbow assembly 25, the present invention also contemplates the use of multiple arm assemblies 20 which may be configured to connect to one another in a similar manner as the vertical member 15 and arm assembly 20 described in detail above. As a result, in the preferred embodiments, the connection joints between the various arms or arm assemblies 20 and elbow assemblies 25 may all be rotated or pivoted in relation to one another, such that the overall display of the electronics, and the orientation in which it is shown, can be modified by the user.

Figures 6A, 6B:
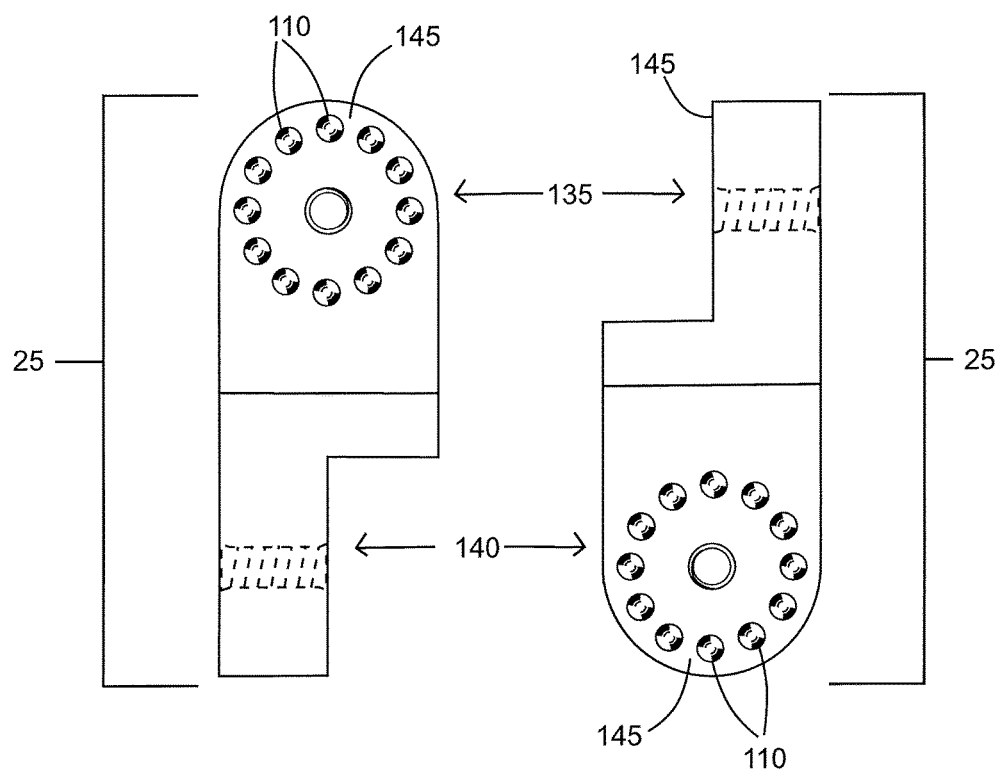
FIG. 6(a) is front view of one embodiment of the elbow assembly.
FIG. 6(b) is a side view of the embodiment of FIG. 6(a).

Referring generally to FIGS. 1, 6(*a*), and 6(*b*), the elbow assembly 25 may include recesses 110 at both ends (elbow assembly upper portion 135 and elbow assembly lower portion 140), configured to receive dowel pins 115 (or other protrusions) in the same manner as the recess 110 in the vertical member 15 described above. The recesses 110 in the elbow assembly 25 may be arranged in a circular pattern, allowing for rotation of the arm assembly 20 in relation to the elbow assembly 25. Additionally, the elbow assembly 25 recesses 110 may also allow locking bolts 130 (securing pins, or other connecting devices) to be inserted through the arm assembly 20 and elbow assembly 25 (or elbow assembly 25 and plate support member 30) so that the two members are securely locked together once oriented according to user preference. Finally, while the elbow assembly 25 recesses 110 are shown as configured to interface with the dowel pin 115 of the arm assembly 20 and plate support member 30, it should be noted that other configurations for rotating may be used as described above. For example, the elbow assembly 25 may contain teeth, to interlock with teeth in an arm assembly 20. Alternatively, ball-and-socket or other movable joint methods may be used to connect the elbow assembly 25 to another member.

As shown in FIGS. 1, 6(*a*) and 6(*b*), the upper portion 135 of the elbow assembly 25 may include one or more recesses 110 configured to receive and interface with a plate support member 30. The upper portion 135 of the elbow assembly 25 may also have a mounting face 145 configured to receive and interface with plate support member 30. The mounting face 145 in the upper portion 135 of the elbow assembly 25 is shown as being perpendicular to a corresponding mounting face 145 in the lower portion 140 of the elbow assembly 25 (which is configured to receive and interface with the arm assembly 20), thus allowing ninety degree rotation of the components above and below the elbow assembly 25. As described above, it is contemplated that a second arm assembly 20 may be used in place of, or in addition to, the elbow assembly 25. Again, the elbow assembly 25 may be configured to receive dowel pins 115 that protrude from the surface of the plate support member 30 in such a way that allows for rotation pursuant to user preference.

Figures 7A, 7B:
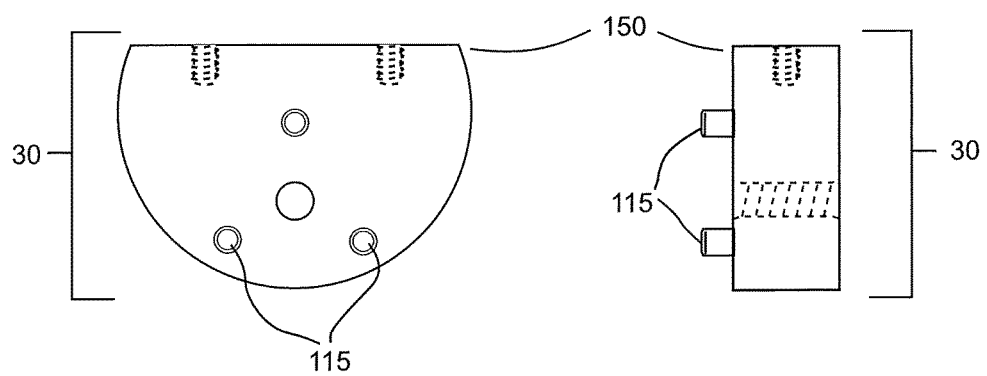
FIG. 7(a) is a front view of one embodiment of the plate support member.
FIG. 7(b) is a side view of the embodiment of FIG. 7(a).

As shown in FIGS. 7(*a*) and 7(*b*), the top portion 150 of the plate support member 30 may be flat so that the mounting plate 35 can rest securely on the flat surface. The plate support member 30 may be of various shapes, but in a preferred embodiment, shown in FIGS. 7(*a*) and 7(*b*), it is in the shape of a partial circle, with the flat surface at the top portion 150. In addition, the flat portion of the plate support member 30 may include one or more recesses 110 (shown in dashed lines at the top of FIG. 7(*a*)) configured to receive securing bolts or dowel pins 115, allowing for the mounting plate 35 to be fixed to the plate support member 30. As with other components, the plate support member 30 may be secured to the elbow assembly 25 using a locking bolt 130 (as shown in FIG. 1) through a hole in the plate support member (also shown in FIG. 7(*b*) between the two dowel pins 115).

Referring generally to FIG. 1, the mounting plate 35 may be a flat plate that is connectable to the plate support member 30, but it is not required to be flat. In a preferred embodiment, the mounting plate 35 has elongated, curved slots (shown in FIG. 1) to receive the securing bolts 135 (or dowel pins or other securing means) that secure mounting plate 35 to the plate support member 30. These elongated, curved slots allow the mounting plate 35 to be rotated around the vertical axis to allow the user to alter the orientation of the mounting plate 35 relative to the plate support member 30 before being secured to the plate support member 30. In an alternative configuration, the mounting plate can use multiple recesses, preferably in a circular pattern, to allow for similar orientation configuration. Alternatively, the mounting plate 35 may be directly affixed to an arm assembly 20 or elbow assembly 25. The mounting plate 35 may include one or more recesses 110 at varying locations along its length to receive and secure standard brackets commonly provided by one or more of the most common electronics manufacturers. A plurality of recesses 110, each configured to interface with and receive a different electronics manufacturer's standard brackets may be provided on the mounting plate 35, allowing for a "universal" mounting plate to be used with standard brackets from many common electronics manufacturers. In another embodiment, separate mounting plates 35, each specifically configured for a different electronics manufacturer, may be interchanged depending on user preference. As described above, the mounting plate 35 may also have recesses 110, for the connection between the mounting plate 35 and plate support member 30 (see FIG. 1) to allow rotation of the mounting plate 35 even if the plate support member 30 is fixed.

In other embodiments, the mounting plate 35 can be configured to replace the "standard" brackets that are provided by the electronics manufacturer, allowing the electronics to be attached to the mounting plate 35 without attaching the "standard" electronics bracket to the mounting plate 35. In this embodiment, the mounting plate 35 can be configured to allow connection with the plate support member 30 as described above, but also have additional elements to actually secure the electronics to the mounting plate 35, for example vertical arms to secure to the sides of the electronics (as is relatively standard in the industry). In other words, the mounting plate 35 simply replicates the configuration of standard electronics mount brackets in the vertical arms portion.

While the preferred embodiment uses a vertical member 15, arm assembly 20, an elbow assembly 25, a plate support member 30, and mounting (or support) plate 35, more or fewer of these components may be used. In other embodiments, only one arm assembly 20 and a plate support member 30 are used, or the plate support member 30 may be directly connected to the vertical member 15 with no arm assemblies 20 in between. Similarly, two or more arm assemblies 20 may be used. Any combination of arm assemblies 20, elbow assemblies 25, and plate support members 30 could also be used to achieve the desired length and orientation. Also, in other embodiments, one or more of the attachments between arm assemblies 20 or other types of members, may not be moveable, or pivotable, but rather can be configured to remain fixed to one another.

For example, in one embodiments, the electronics mount generally comprises a base member 10 (or base assembly) that is secured to the boat, a vertical member 15 (or post) secured to the base member 10, a plate support member 30, and a mounting plate 35. As described herein, the vertical member 15 may be a single member, or two separate components (a vertical member 15 bottom portion 65 and vertical member 15 top portion 105, shown in FIGS. 4(a) and (b)). In some embodiments of this configuration, the vertical member 15 and plate support member 30 have one or more dowel pins 70 (or other protrusions) and corresponding recesses 110 to allow the vertical member 15 and plate support member 30 to fit together in a variety of orientations (as described above). In this manner, plate support member 30 can be rotated and secured to the vertical member 15 such that the mounting plate 35 is substantially horizontal (if desired by the user) so that the mounted electronics will also be substantially horizontal. The plate support member 30 can be further secured to the vertical member 15 with a locking bolt 130, cam arm 160/cam arm bolt 165 combination, or any other manner to secure the two components known to those of skill in the art. This embodiment may also use the locking nut 90 (with or without the cam arm 160/cam arm bolt 165 combination) to secure the vertical member 15 to the base member 10. This configuration may be desirable for an electronics mount at the front of the boat, and which may allow the electronics to sit closer to the boat surface, out of the user's way. If needed or desired, one or more arm assemblies 20 and/or elbow assemblies 25 can also be used.

Although many of the embodiments describe use of a dowel pin 115, those of skill in the art will recognize that other structural features can be used to secure various elements together. For example, male locking members, a machined tab or bump in the various members, a bolt, or other type of pin can be used. Similarly, the embodiments showing use of a slot or channel (as examples) can also use other structural features recognized by those of skill in the art that can integrate with the pins/male locking members/tabs/bumps/bolts (e.g., female locking members) to secure elements together. Obviously, the location of the various structural features described herein can be interchanged, for example, the pins can be located on the vertical member, and slot/channel/female locking feature can be located in the base. The other structural elements can likewise be modified to be interchanged with the various other elements to which they are attached.

It should also be recognized that in most embodiments, the base member 10 will be mounted in a vertical orientation. However, the present invention also contemplates that it could be attached to a boat in virtually any type of orientation, including horizontally, or at any angle off of any surface of the boat. Thus, although certain components of the invention may be described as, for example, a "vertical member", such description is for the purposes of differentiating the components rather than limiting its orientation. Thus, if the base member 10 of the present invention is mounted to the boat in a horizontal orientation, the "vertical member" 10 will also be in the horizontal orientation. Similarly, by example and not limitation, the use of the term "elbow assembly" is not intended to be limiting in the configuration or orientation of the component.

By utilizing the various components and in various embodiments of the invention, the electronics mount assembly allows multiple points of movement and orientation. With the various components, the base member 10 can be mounted on any surface (whether vertical, horizontal, or at an angle), and the mounting plate 35 still be on a horizontal plane (or vertical plane if desired). These multiple points of freedom give the user multiple options for mounting electronics that have previously not be enjoyed by users.

What is claimed is:

1. An electronics mount comprising:
   a. a base member having a recessed cavity;
   b. a vertical member configured to be positioned at least partially in the recessed cavity of the base member, wherein the vertical member has at least one recessed channel;
   c. an arm assembly configured to connect to the vertical member;
   d. an elbow assembly configured to connect to the arm assembly;
   e. a plate support member configured to connect to the elbow assembly;
   f. a mounting bracket configured to connect to the plate support member; and
   g. a moveable sleeve configured to secure the vertical member in the recessed cavity of the base member.

2. A kit for constructing an electronics mount comprising:
   a. a base member;
   b. a vertical member, wherein the vertical member is connectable to the base member;
   c. an arm assembly having a first end and a second end wherein the all assembly first end is connectable to the vertical member;
   d. an elbow assembly wherein the elbow assembly is connectable to the arm assembly second end;
   e. a plate support member wherein the plate support member is connectable to the elbow assembly; and
   f. a mounting bracket wherein the mounting bracket is connectable to the plate support member.

3. The electronics mount of claim 1 further comprising a spring positioned in the recessed cavity, wherein the spring provides an upward bias on the vertical member when positioned in the recessed cavity.

4. The electronic mount of claim 1 wherein the base member has at least one protrusion configured to engage the recessed channel of the vertical member.

5. The electronics mount of claim 1, wherein the moveable sleeve is threaded.

6. The electronics mount of claim 1, wherein the moveable sleeve comprises a cam arm and cam arm bolt.

7. The electronics mount of claim 1, wherein at least one of the connection between the vertical member and arm assembly, the connection between the arm assembly and elbow assembly, and the connection between the elbow assembly and plate support member comprises a plurality of opposing recesses and protrusions.

8. The electronics mount of claim 1, wherein each of the connections between the vertical member and arm assembly, the connection between the arm assembly and elbow assembly, and the connection between the elbow assembly and plate support member comprise a plurality of opposing recesses and protrusions.

9. The kit of claim 2 further comprising a moveable sleeve configured to secure the vertical member to the base member.

10. The kit of claim 2 wherein at least one of the vertical member, the arm assembly, the elbow assembly, and the plate support member has a plurality protrusions, and wherein at least one of the vertical member, the arm assembly, the elbow assembly, and the plate support member has a plurality of recesses to receive the plurality of protrusions.

11. The kit of claim 2 wherein the base member has a recessed cavity and a spring positioned in the recessed cavity, wherein the spring provides an upward bias on the vertical member when positioned in the recessed cavity.

12. The kit of claim 2, wherein the vertical member comprises a first plurality of connection structures and the arm assembly comprises a second plurality of connection structures, wherein the first plurality of connection structures is selected from the group of a plurality of recesses and a plurality of protrusions, wherein the second plurality of connection structures is selected from the other member of the group, wherein the arm assembly is directly connectable to the vertical member by the first and second pluralities of connection structures.

13. The kit of claim 2, wherein the arm assembly comprises a first plurality of connection structures and the elbow assembly comprises a second plurality of connection structures, wherein the first plurality of connection structures is selected from the group a plurality of recesses and a plurality of protrusions, wherein the second plurality of connection structures is selected from the other member of the group, wherein the elbow assembly is directly connectable to the arm assembly by the first and second pluralities of connection structures.

14. An electronics mount comprising:
  a. a base member having a top portion and a bottom portion, said top portion and said bottom portion each having a cylindrical cross section, and wherein said bottom portion has mounting holes configured to secure the base member to a boat;
  b. a vertical member wherein the vertical member is connectable to the base member;
  c. a mounting plate wherein the mounting plate is connectable to the vertical member and at least partially rotatable around a vertical axis of the vertical member; and
  d. a moveable sleeve configured to shift down over a connection between the vertical member and base member to secure said connection.

15. The electronics mount of claim 14, wherein the base member has a recessed cavity, and at least a portion of the vertical member is receivable in the recessed cavity of the base member.

16. The electronics mount of claim 14, wherein the vertical member has a recessed cavity and at least a portion of the base member is receivable in the recessed cavity of the vertical member.

17. The electronics mount of claim 15 further comprising a spring that provides an upward force against the vertical member, and wherein the base member has at least one protrusion inside the recessed cavity, and the vertical member has at least one locking channel to receive the at least one protrusion.

18. The electronics mount of claim 14, wherein the moveable sleeve is threaded and the base member is threaded to receive the threaded moveable sleeve.

19. The electronics mount of claim 18, wherein the moveable sleeve has a body and a gap in the body, the moveable sleeve comprising a cam arm and a cam arm bolt connected to the body on each side of the gap.

20. The electronics mount of claim 14, wherein the vertical member comprises a bottom portion and a top portion, wherein the top portion is removeably connectable to the bottom portion.

* * * * *